United States Patent
Küspert et al.

[11] Patent Number: 5,810,339
[45] Date of Patent: Sep. 22, 1998

[54] BALANCING ELEMENT FOR A FLAP OPENING, ESPECIALLY AT AN AUTOMOBILE

[75] Inventors: Max Küspert, Marktredwitz; Wanke Klaus, Wunsiedel; Joachim Heinke, Marktredwitz, all of Germany

[73] Assignee: Datec Scherdel Datentechnik Forschungs-und Entwicklungs-GmbH, Marktredwitz, Germany

[21] Appl. No.: 748,391

[22] Filed: Nov. 13, 1996

[30] Foreign Application Priority Data

Nov. 14, 1995 [DE] Germany ......... 295 18 800 U
Dec. 6, 1995 [DE] Germany ......... 195 47 257.8

[51] Int. Cl.$^6$ .................................................. B60G 11/22
[52] U.S. Cl. ........................................ 267/293; 267/73
[58] Field of Search .................. 267/64.12, 70, 267/74, 69, 292, 293, 73, 141, 153; 248/610–614, 58, 317, 339, 60, 560, 562, 564, 589, 565; 188/268

[56] References Cited

U.S. PATENT DOCUMENTS

| | | |
|---|---|---|
| 1,385,919 | 7/1921 | Irwin ......... 267/73 |
| 1,517,138 | 11/1924 | Wike ......... 267/73 |
| 1,779,663 | 10/1930 | Cowell ......... 267/293 |
| 4,057,235 | 11/1977 | Halopoff ......... 267/73 |
| 4,118,020 | 10/1978 | Myers ......... 267/168 |
| 4,509,473 | 4/1985 | Hamparian ......... 267/168 |
| 4,634,088 | 1/1987 | Schad ......... 188/268 |
| 4,962,916 | 10/1990 | Palinkas ......... 267/293 |
| 5,120,030 | 6/1992 | Lin ......... 267/64.12 |
| 5,375,823 | 12/1994 | Navas ......... 267/293 |

FOREIGN PATENT DOCUMENTS 381894 10/1932 United Kingdom ......... 267/73

*Primary Examiner*—Robert J. Oberleitner
*Assistant Examiner*—C. T. Bartz
*Attorney, Agent, or Firm*—Baker & Botts, L.L.P.

[57] ABSTRACT

There is described a balancing element for a flap opening especially at an automobile, with two end points, which are adjustable relative to one another in the principal direction of the element, and comprising two draw yokes (15) which are operatively connected together and which are enclosed by a tension spring (20) snugly embracing them and having its end points fixed near the end points of the draw yokes (15).

5 Claims, 2 Drawing Sheets

BALANCING ELEMENT FOR A FLAP OPENING, ESPECIALLY AT AN AUTOMOBILE

The present Invention relates to a balancing element for a flap opening, especially at a motor vehicle.

With flap openings there is basically the desire to design the necessary opening and closing forces to be as constant as possible over the entire travel of the flap and thus to keep the expenditure of force necessary for the opening and closing to be as small as possible. This applies particularly when the flap must be moved upwardly or downwardly about a horizontally disposed axis.

It is already long known to retain flaps, which are rotatable about a horizontally disposed axis, by chains, cables or articulated brackets in such a manner that in the open end setting they exhibit a horizontally disposed surface, which represents a continuation, virtually free of projection, of the actual loading surface. However, these solutions known for a long time do not bring any force relief during opening or closing of the flap, which is very desirable during use of such a flap.

Gas springs represent a certain advance insofar as apart from a limitation of deflection they lead to a minimisation of the required actuating forces. However, such gas springs are unsuitable in the case of assisting controlling or the lower tailgate of a vehicle for the carriage of loads. In such a case the lower tailgate is frequently used as an extended load surface and is thus subjected to very high loadings, especially because in such a case additional shock-like peak loadings occur during travel. The piston rod and the piston of a gas spring may not withstand such loadings. Piston rod and piston of the gas spring then receive unavoidable damage, so that a gas spring is excluded for such purposes.

The invention has as its object the provision of a robust and at the same time reliably acting force relief for the actuation of flaps, especially at motor vehicles.

Advantageous embodiments of the invention are evident from the following description.

The invention is explained in the following with reference to the drawing figures, in which.

Figure 1:
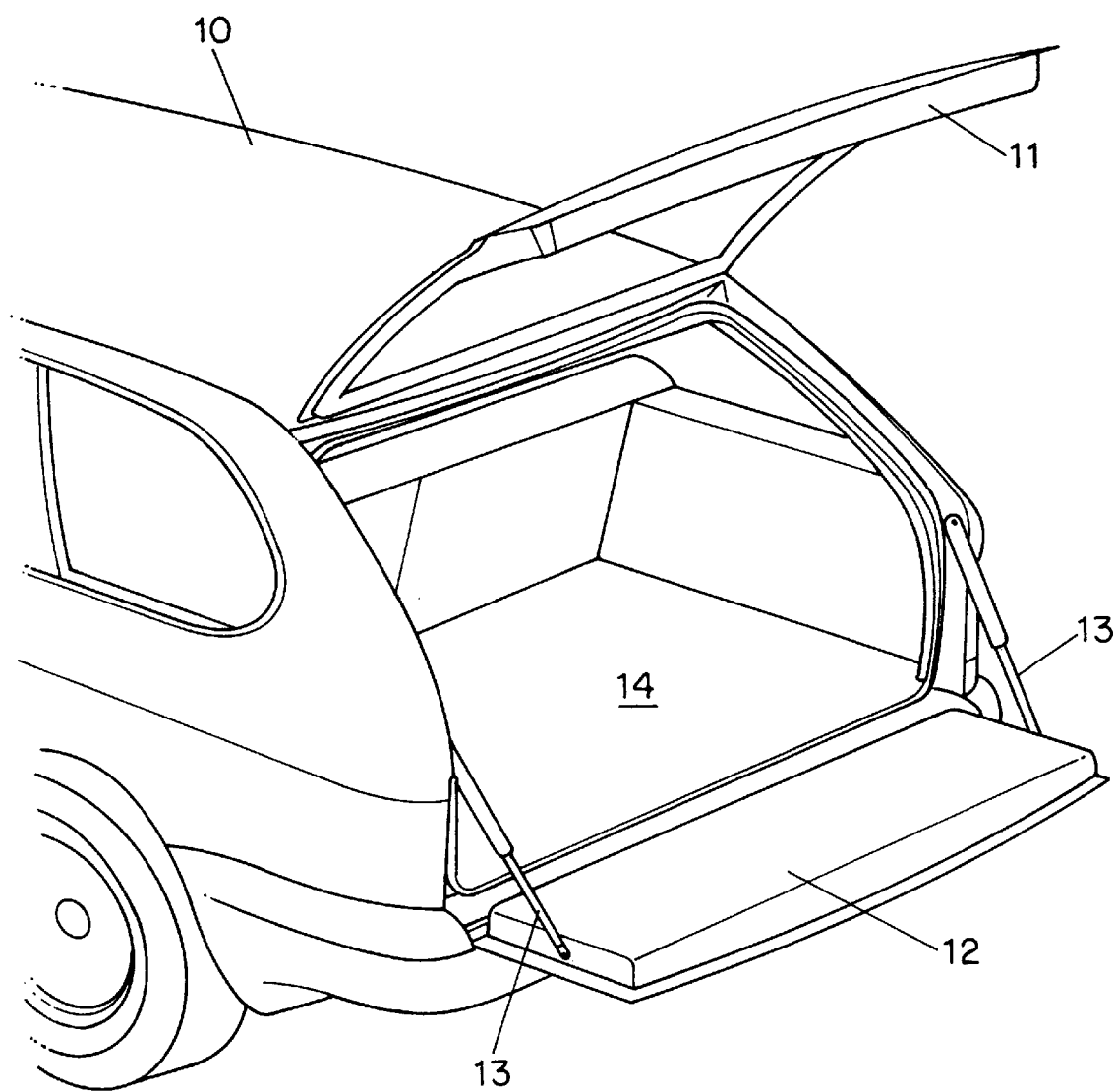
FIG. 1 shows a basic illustration of the tail part of a motor vehicle, with two tail gates, which are pivotable about horizontal axes, with balancing elements.

FIG. 1 shows the tail part of a stationwagon motor vehicle 10 with rear load flaps, an upper load flap 11 and a lower load flap 12, which are each pivotable about a respective horizontal axis. The lower load flap 12 is guided by way of balancing elements 13 and to a certain extent also controlled.

In the open end setting the lower load flap 12 forms with the inner load surface 14 of the motor vehicle a virtually projection-free continuous loading surface.

Figure 2:
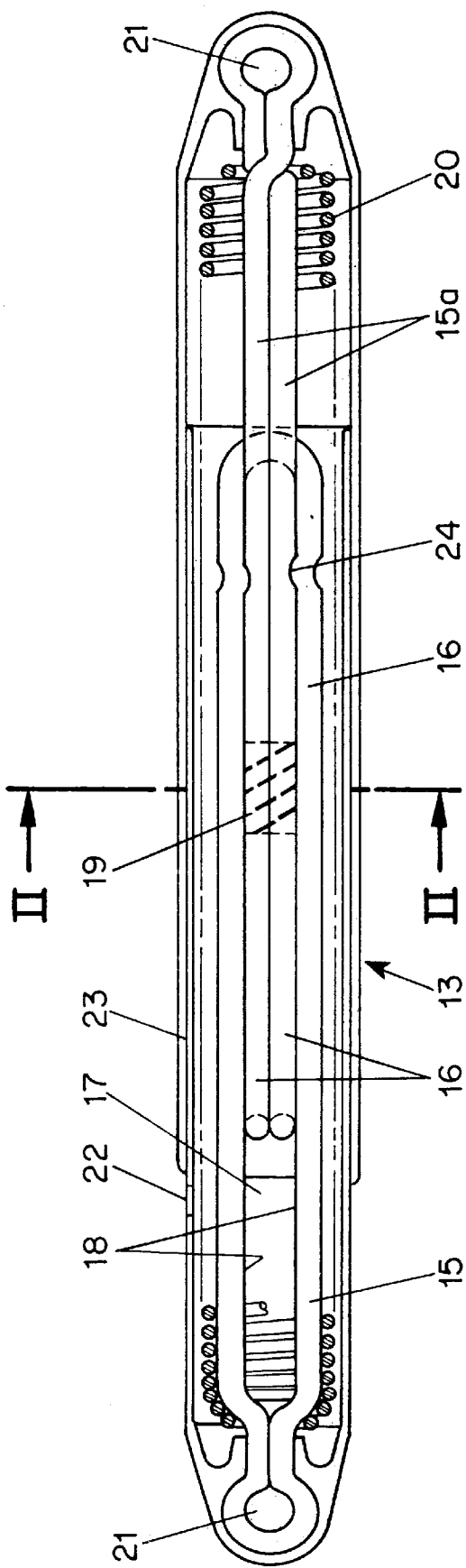
FIG. 2 shows a longitudinal section through a balancing element.
Figure 3:
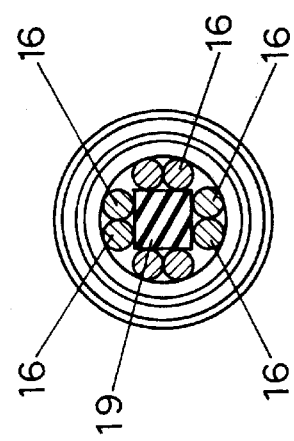
FIG. 3 shows a cross-section along the line II—II of this balancing element.

As can be recognised from FIG. 2, two draw yokes 15, which are turned relative to one another each through 90 degrees about the principal axis and are operatively connected together in a mode and manner to be described in more detail later, are present in a balancing element 13. Each draw yoke 15 consists of two or more elongate, loop-shaped coils 16 which are arranged one upon the other and which are preferably bent from a suitable strong wire. An elongate cavity 17 with parallel extending boundaries 18 in one plane arises within the individual coils 16 of the draw yoke 15. In the second plane perpendicular thereto the thus arising cavity is generally free. Engaged in this cavity 17 is a second draw yoke 15a which similarly consists of several windings 16 and which is turned relative to the first draw yoke 15 through 90 degrees about the principal axis of the balancing element 13. By way of the two draw yokes 15 turned relative to one another each through 90 degrees in the main axis a rotationally secure connection between the two draw yokes 15, 15a arises , so that the two draw yokes 15, 15a cannot be twisted about the principal axis with respect to each other. Independently thereof the two draw yokes 15, 15a remain freely movable in longitudinal direction by a predetermined amount, i.e. the overall length of the arrangement consisting of the two draw yokes 15, 15a can be reduced or also enlarged. Only when the two draw yokes 15, 15a approach the end positions corresponding Lo the drawn out or driven in state of the overall arrangement does a movement limitation take place. This can be effected by direct contact of the end radii 18 of the draw yokes 15, but expediently is effected by interposition of a damping element 19 in order in this rode and manner to avoid hard impacts. The damping element 19 can be, for example, a block which consists of rubber or synthetic material and which—as FIG. 3 shows—is guided laterally between the loop-shaped coils 16 of the draw yokes 15. In longitudinal direction the damping element 19 is largely freely movable between the two end radii 18 of the loop-shaped coils 16 of the draw yokes 15. It is restricted in its longitudinal movement by a certain extent merely by a slight lateral pressing.

The afore-described loop-shaped coils 16 of the draw yokes 15 are externally surrounded by a substantially cylindrically coiled tension spring 20, which has a smaller diameter at its two ends and thus lays virtually snugly around the arrangement consisting of the two draw yokes 15. A fixing of the tension spring 20 at its two ends in its principal direction is effected at the same time by the reduced diameter of the tension spring in the end regions thereof. The end points of the arrangement formed from the draw yokes 15 are expediently so shaped that fastening eyes 21, by which the entire arrangement can be fastened to the vehicle and to the movable flaps 11, 12, result. The thus resulting overall arrangement is enclosed by two cylinder parts 22, 23 telescopically engaging one over the other. The arrangement is thereby encapsulated and thus secure against penetration of dirt. Moreover, accident risks are also excluded by the encapsulation, as could result, for example, by unintended engagement or penetration into the intermediate spaces between the spring windings.

In general it is desirable if an arresting takes place at least in one end setting. For this purpose detent corrugations 24 are provided near the end region 18 of the loop-shaped coils 16 of at least one draw yoke 15 and to a certain degree hinder a return movement of the loop-shaped coils 16 of the other draw yoke 15. The spacing of these detent corrugations 24 is selected so that, taking into consideration the damping element 19, they keep the other draw yoke 15 In the thus predetermined end position. Only by overcoming a specific additional resistance is the thus held draw yoke 15 conducted past the detent corrugation 24 and can then freely move again in longitudinal direction.

What is claimed is:

1. A structural element for a flap opening especially at an automobile, having two end points which are mutually adjustable in a principal direction, and comprising:

first and second draw yokes (15, 15a) which are operatively connected to each other for mutual adjustment in the principal direction, with each of the draw yokes (15, 15*a*) comprising a plurality of superimposed loops (16) which are elongated in the principal direction, and with the loops of the first draw yoke (15) having a first axis perpendicular to the principal axis and the loops of the second draw yoke (15*a*) having a second axis perpendicular to both the principal axis and the first axis, so that a cavity (17) is formed within the loops of the draw yokes (15, 15*a*);

a tension spring (20) which snugly embraces the draw yokes (15, 15*a*) and which has two end points each of which is fixed near an end point of a respective one of the draw yokes (15, 15*a*); and a damper element (19) disposed in the cavity (17).

2. The structural element according to claim 1, wherein the damper element (19) consists of rubber.

3. The structural element according to claim 1, wherein the damper element (19) consists of an elastic plastics material.

4. The structural element according to claim 1, wherein at least one (15) of the draw yokes (15, 15*a*) has a detent corrugation (24) for mechanically positive arresting of the structural element in at least one end position.

5. The structural element according to claim 1, further comprising two mutually telescopic cylinder parts (22, 23) which surround an outer circumference of the tension spring (20).

* * * * *

UNITED STATES PATENT AND TRADEMARK OFFICE
CERTIFICATE OF CORRECTION

PATENT NO. : 5,810,339

DATED : September 22, 1998

INVENTOR(S) : Küspert et al.

It is certified that error appears in the above-identified patent and that said Letters Patent is hereby corrected as shown below:

On the title page: Item
, [75] Inventors: "Wanke Klause," should read -- Klause Wanke, --.

Signed and Sealed this

Seventeenth Day of October, 2000

Attest:

Q. TODD DICKINSON

*Attesting Officer*  *Director of Patents and Trademarks*